United States Patent [19]

Benson

[11] Patent Number: 4,959,639
[45] Date of Patent: Sep. 25, 1990

[54] FLUID DETECTING

[76] Inventor: Robert A. Benson, 13 Commonwealth Ave., Boston, Mass. 02116

[21] Appl. No.: 329,326

[22] Filed: Mar. 27, 1989

[51] Int. Cl.⁵ .............................................. G08B 21/00
[52] U.S. Cl. .................................... 340/618; 340/605; 340/619; 116/227
[58] Field of Search ............... 340/604, 605, 603, 618, 340/619; 73/61.1 R, 49.2 T; 200/61.04; 116/208, 227, DIG. 7

[56] References Cited

U.S. PATENT DOCUMENTS 4,351,642  9/1982  Bonavent et al. ............... 340/604 X
4,596,980  6/1986  Bergeron et al. .................... 340/626
4,765,178  8/1988  Kempf et al. ......................... 73/49.2

OTHER PUBLICATIONS

Toltech, Hydrocarbon Leak and Spill Monitors (Prior to '88).

Primary Examiner—Joseph A. Orsino
Assistant Examiner—Jeffery A. Hofsass

[57] ABSTRACT

A flexible rod-and sleeve assembly with rod and surrounding sleeve affixed to each other at their bottom ends is maintained by a spring to put the sleeve in tension. The assembly is inserted into a cavity such as a monitoring well so as to extend below the lowest level which the water table may assume. The sleeve is made of a material which is attacked by petroleum products but not by water, and when a layer of petroleum liquid such as gasoline collects on the surface of the water in contact with some region of the sleeve, the sleeve material loses its strength and ruptures. This results in an upward movement of the sleeve, which is used to actuate alarm and signaling mechanisms.

10 Claims, 4 Drawing Sheets

FLUID DETECTING

BRIEF SUMMARY OF THE INVENTION

This invention relates to the detecting of liquid in a cavity. It is especially applicable to the detection of a petroleum liquid such as gasoline floating on the top of a body of water. A representative situation in which the invention might be used in the monitoring for environmental pollution form a gasoline sales outlet. Such an installation typically includes buried tanks and other equipment handling petroleum products. This equipment is susceptible to spills and leakage from places not easily observed. Spilled and leaking petroleum liquids typically seep downwards through the soil until they encounter the water table. They then spread out horizontally over the top of the water table in a comparatively thin sheet. The detection of this layer of petroleum liquid is made more difficult because the level of the water table varies seasonally and from year to year, so that the position of the petroleum layer cannot be forecast.

The invention features a flexible rod-and-sleeve assembly which is inserted into a monitoring cavity such as a well so as to extend below the lowest level which the water table may assume. The flexibility of the rod-and-sleeve assembly permits insertion into cavities following curved paths. The rod and sleeve of the assembly are affixed to each other at their bottom ends, and a spring pulls up on the sleeve to maintain it in tension and the rod in compression. The sleeve is made of a material which is attacked by petroleum products but not by water, and when a layer of petroleum liquid such as gasoline collects on the surface of the water in contact with some region of the sleeve, the sleeve material loses its strength and ruptures. This results in an upward movement of the sleeve, which is used to actuate alarm and signaling mechanisms.

DETAILED DESCRIPTION

Figure 1:
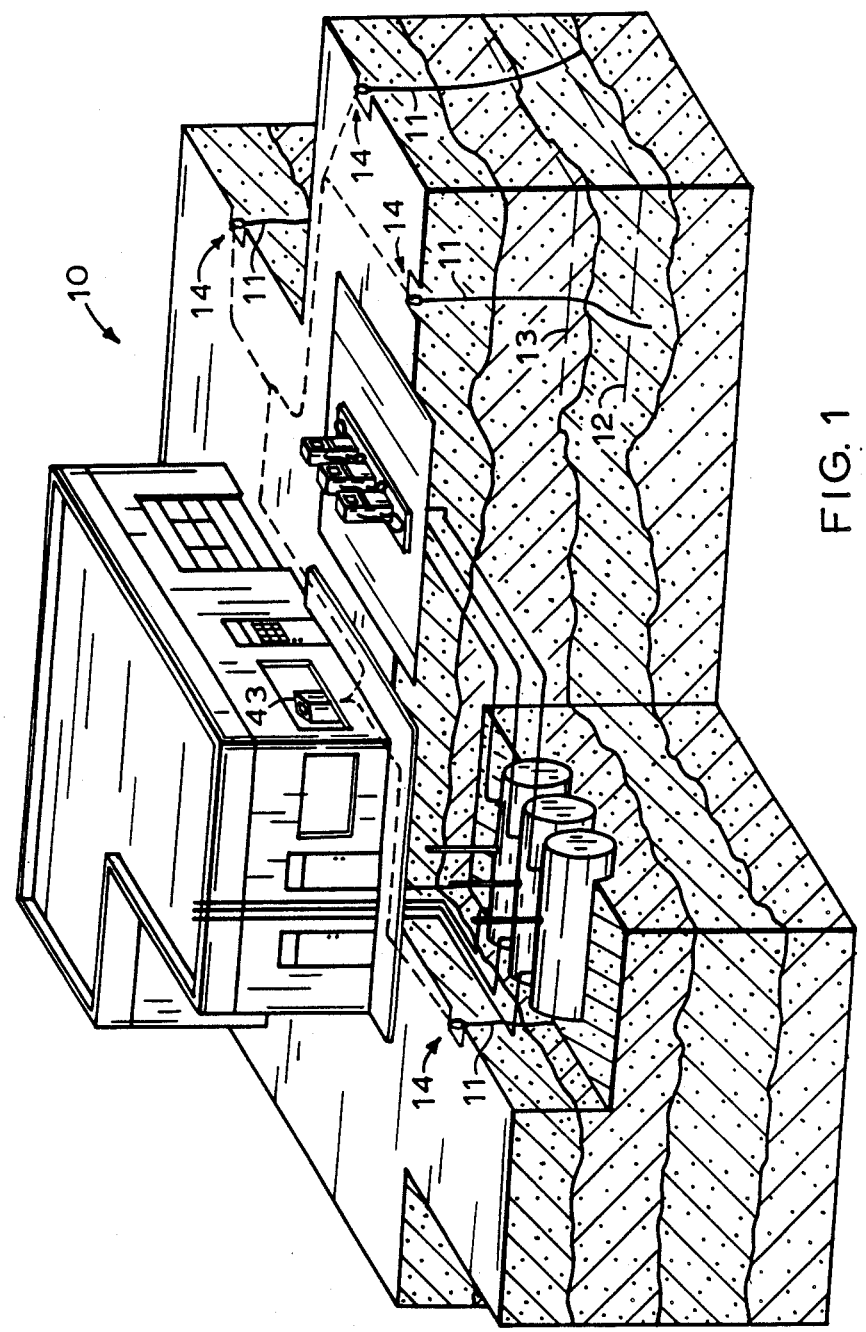
FIG. 1 shows devices according to the invention installed in monitoring wells near a gasoline station.

Referring particularly to FIG. 1, a number of monitoring well bores 11 are situated around the periphery of gasoline selling facility 10. The water table beneath facility 10 varies seasonally from a low level 12 to a high level 13. Bores 11 of monitoring wells penetrate through the range of the water table.

Figure 2:
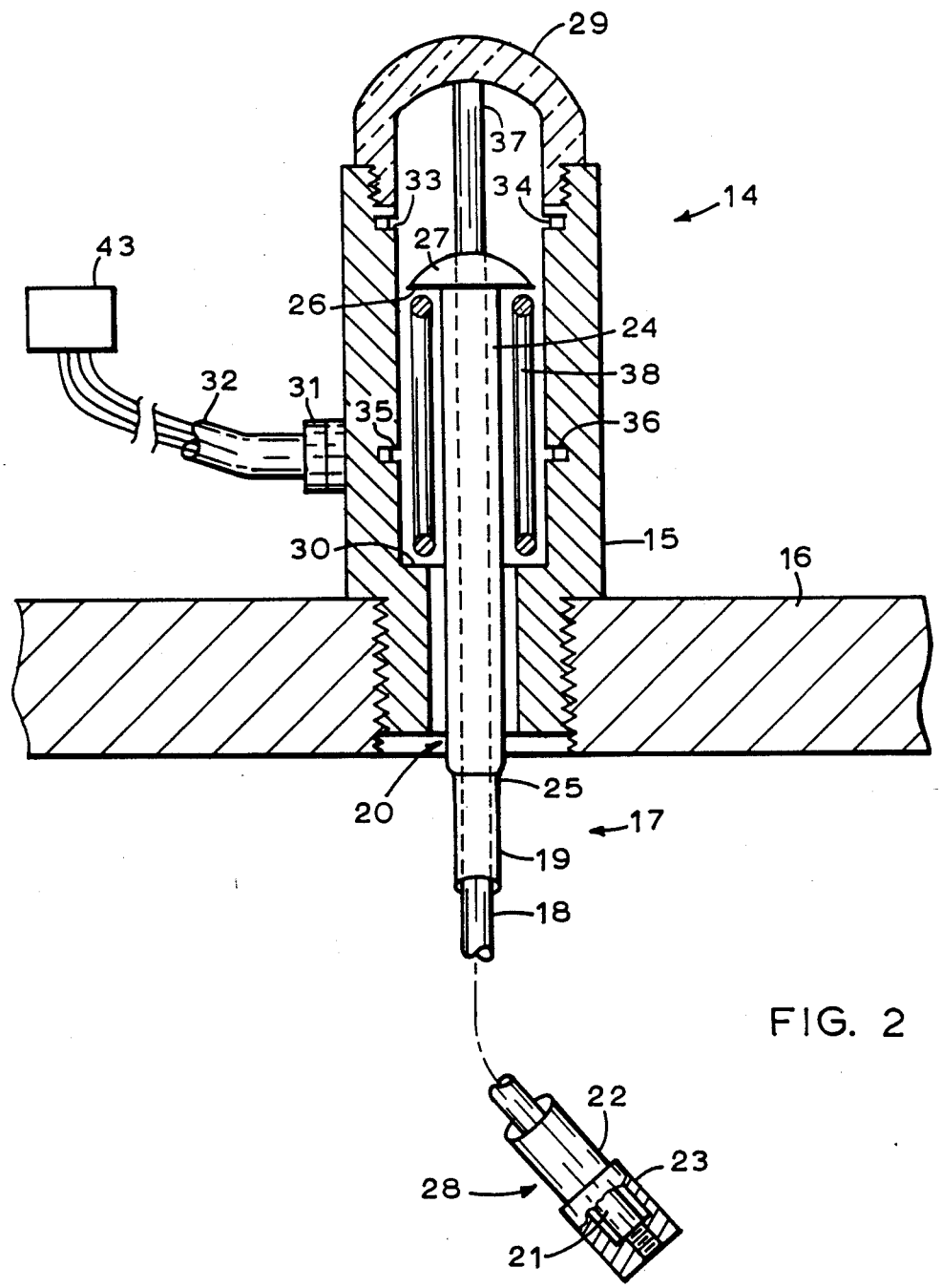
FIG. 2 shows one of the devices of FIG. 1 in partial cross-section installed at a well head.

A detection device 14, according to the invention, is installed in each of well bores 11, and is shown more particularly in FIG. 2.

Figure 3:
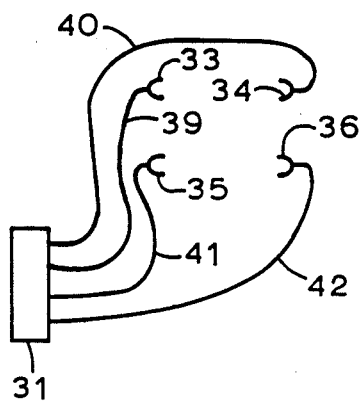
FIG. 3 shows fiber optic paths which are incorporated in the device.

Housing 15 of the detection device 14 is installed in well cap 16, and includes window 29 made of transparent material, and spring bearing ledge 30. Connector 31 provides connections for optical fiber cable 32. Optical fiber sights 33, 34, 35, and 36 are connected by optical fibers 39, 40, 41, and 42 threaded through housing 15 to connector 31, as shown more particularly in FIG. 3.

Rod-and-sleeve assembly 17 includes flexible central rod 18 of circular cross-section and sleeve 19 of annular cross-section disposed around rod 18. Rod 18 and sleeve 19 are dimensioned so that they can slip relative to one another. Rod 18 is advantageously ¼ inch diameter; sleeve 5/16 inch outer diameter, 0.028 inch wall thickness. Bottom end 21 of rod 18 is affixed to bottom end 22 of sleeve 19 by bottom fitting 23. Top fitting 24 is affixed to top 25 of sleeve 18 and provides spring bearing 26 and signal object 27. Rod-and-sleeve assembly 17 is positioned with its top end 20 in housing 15 and its lower end 28 extending down into well bore 11 to below the minimum level 12 of the water table. Top 37 of rod 18 abuts against window 29. Spring 38 is positioned in a compressed condition between spring bearing 26 and spring bearing ledge 30 to provide biasing means for maintaining rod 18 in compression and sleeve 19 in tension.

Sight ports 35 and 36 are positioned and directed to look at each other across the interior of housing 15 so that an optical path is completed between optic fibers 41 and 42 when rod-and-sleeve assembly 17 is not installed in housing 15 but is not completed when rod-and-sleeve assembly 17 is installed in housing 15. Sight ports 33 and 34 are positioned and directed to look at each other across the interior of housing 15 so that an optical path is completed between optic fibers 39 and 40 when only rod 18 occupies the upper part of housing 15 but is not completed when top fitting 24 occupies the upper part of housing 15.

The operation of the detecting device is as follows. A monitoring well is drilled at a sites where a petroleum product such as gasoline might be expected, in the event of a leak or spill, to collect as a layer on top of the water table, the well depth being sufficient to extend below the range of water table levels. Housing 15 (without window 29) is then installed at the head of the monitoring well, and optical cable is installed to connect housing 15 to monitoring equipment 43. At this point, monitor 43 will show an optical path between sight ports 35 and 36 indicating that a rod-and-sleeve assembly is not in place in the housing. Spring 38 is then placed in housing 15, and rod-and-sleeve assembly 17 is inserted into housing 15 so that its lower end extends into the cavity of the well to a position below the lowest level of the water table. At this point, rod-and-sleeve assembly 17 is supported by spring 38 in an elevated position with signal object 27 above sight ports 33 and 34. Window 29 is then installed in the housing by pushing it down on the top of rod 18 and fastening it to the housing wall. The installation of window 29 will push rod-and-sleeve assembly 17 down to the position shown in FIG. 2 and introduce compression in rod 18 and tension in sleeve 19. In this position top fitting 24 is below sight ports 33 and 34, and monitor 43 will indicate a "no alarm" condition because it detects a light path between sight ports 33 and 34. A "sensor installed" condition will also be indicated because the light path between sight ports 35 and 36 is blocked. Signal object 27 will be positioned below window 29 and will be out of sight.

At this point the installation of the detector is completed and it remains as described until a petroleum product, such as gasoline, enters the well and collects in a layer on the surface of the water table. When this happens, the gasoline attacks the sleeve, which after a few minutes loses its tensile strength and breaks under the tension applied by the spring 38. The spring then thrusts the portion of the tube 19 above the break upward so that top fitting 24 interrupts the light path between sight ports 33 and 34, and signal object 27 becomes visible through window 29. The interruption of the light path signals an alarm condition to the monitor, and the now visible signal object provides a visible alarm signal at the site of the well. It may be particularly noted that the alarm operation occurs in the same manner irrespective of the level of the ground water on which the gasoline floats.

The material of sleeve 19 is selected with reference to the objectives and circumstances of the testing. In general, it is made of a material which is attacked by the liquid which is being tested for and not by other liquids which may come in contact with it. In the case of monitoring a gasoline station in surrounding wells as described above, petroleum liquids, such as gasoline, kerosene, and disel oil, would be those tested for, and it would be expected that the rod-and-sleeve assembly would be frequently or always in contact with water. For this service polystyrene is a suitable material for the sleeve. High impact polystyrene (tensile strength 3200–4900 psi; elongation 13–50%; hardness 70–75 shore D; water absorption less than 0.1%) has been found to be particularly advantageous.

Figure 4:
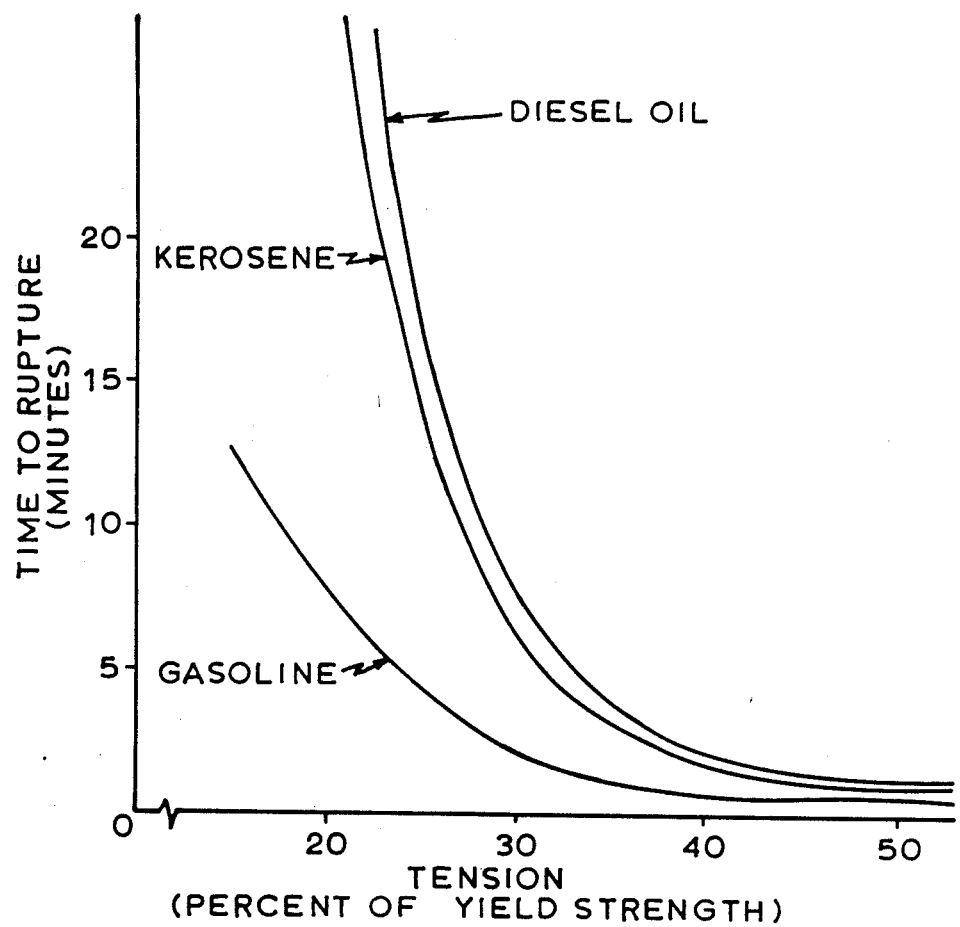
FIG. 4 shows a relationship between time to rupture and tension on the sleeve of the device of the invention.

It has been found that the exposure time for polystyrene to lose its strength under attack by petroleum products depends on the stress in the material. The relationship is shown in FIG. 4, which applies to the sleeve of material and dimensions given above. In order to accelerate response, it is advantageous to determine the dimensions and parameters of spring 38 so as to maintain the tension in the sleeve in the range of 20% to 50% of its yield strength.

The material of rod 18 is less critical, and delrin has been found to be satisfactory material.

Figure 5:
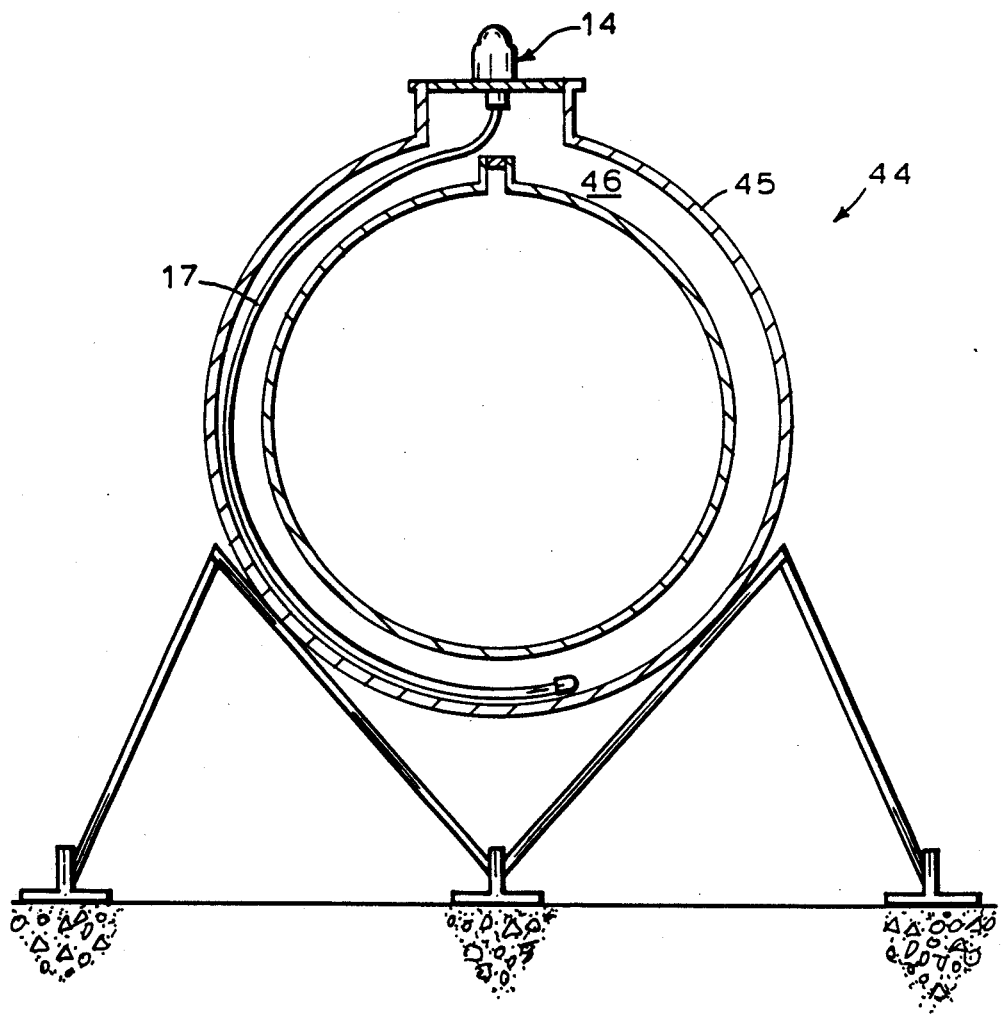
FIG. 5 shows installation of a device according to the invention in a double wall tank.

An alternative installation of the device of the invention to monitor leaks of a petroleum liquid from a double wall tank 44 is shown in FIG. 5. A detection device 14 as described previously is installed in the top of outer wall 45, and rod-and-sleeve assembly is disposed in the interstitial cavity 46 between inner wall 47 and outer wall 45, with its bottom end extending to the bottom of the interstitial cavity, where water from condensation has accumulated. The flexibility of the rod-and-sleeve assembly makes it possible to follow the curve of the cavity between the walls. If there is leakage of liquid immiscible with water from any point of the inner tank, it will accumulate as a layer on the surface of the water condensate. There it will attack the sleeve and produce the alarm action as previously described.

Devices according to the invention have the advantages of being insertable into a cavity with difficult access by a narrow curved path, of being responsive to and giving an alarm at the presence of a dangerous liquid at an indeterminate position in the cavity, of discriminating dangerous liquids from benign ones, and of avoiding any electrical connections or circuitry in the vicinity of a cavity where explosive hazards may be present.

Those skilled in the art will readily recognize that by suitably choosing the materials used, especially in constructing the sleeve, the invention can be applied in a variety of chemical systems. Other embodiments will also be evident to those skilled in the art and intended to be within the scope of the following claims.

What is claimed is:

1. A device for detecting a fluid collected in a cavity comprising
    a rod with a top and a bottom end,
    a sleeve with a top and a bottom end, said sleeve being composed of a material which when exposed to said fluid loses its tensile stength,
        said sleeve being fitted around said rod, and being dimensioned to slide over said rod, and said sleeve and said rod being affixed to each other at said respective bottom ends,
    biasing means engaging said rod and said sleeve for maintaining said rod in compression and said sleeve in tension,
    detection means for detecting movement of the top end of said sleeve relative to the top end of said rod and for signaling after such movement occurs.

2. A device as claimed in claim 1, said rod having a circular cross-section, and said sleeve having a solid wall with an annular cross-section.

3. A device as claimed in claim 1, said sleeve being composed of a material which when exposed to hydrocarbon liquids loses its tensile strength, and when exposed to water does not lose its tensile strength.

4. A device as claimed in claim 3, said sleeve being made of polystyrene.

5. A device as claimed in claim 4, the tension in said sleeve being maintained in the range 20% to 50% of its yield strength.

6. A device as claimed in claim 1, including a window and a signal object, said window and signal object being arranged and connected so that movement of the upper end of said sleeve relative to the upper end of said rod effects exposure of the signal object to view through the window.

7. A device as claimed in claim 3, wherein said detection means employ optical modalities with exclusion of electrical circuitry from within said cavity.

8. A device as claimed in claim 3, wherein the movement of the top end of said sleeve relative to the top end of said rod is detected by interruption of a light path.

9. A method for detecting and signaling the presence within a cavity of a first liquid floating in a layer on top of a second liquid immiscible with said first liquid, the level of said first liquid's top surface being variable between a lower level and an upper, comprising the steps
    provide a rod-and-sleeve assembly comprising
        a rod of flexible material with an upper and a lower end,
        a sleeve of flexible material, with an upper and a lower end, said sleeve being composed of a material which when exposed to said first liquid loses its tensile strength,
            said sleeve being fitted around said rod, being dimensioned to slide over said rod, and said sleeve and said rod being affixed to each other at said respective lower ends,
    flex said assembly, while inserting said assembly along a curved path into said cavity to position said assembly to span the range of level of said first liquid in said cavity,
    maintain a condition of tension in said tube and of compression in said rod,
    detect movement of the upper end of said sleeve relative to the upper end of said rod,
    signal after such movement occurs.

10. A device as claimed in claim 2, said rod and said sleeve being flexible and assembled in a rod-and-sleeve assembly having sufficient flexibility to be inserted along a path curving around a tank.

* * * * *